United States Patent [19]

Boisde et al.

[11] 4,059,408
[45] Nov. 22, 1977

[54] AUTOMATIC LIQUID-LIQUID EXTRACTION DEVICE

[75] Inventors: Gilbert Boisde, Bures sur Yvette; Alain Richerot, Bagneux, both of France

[73] Assignee: Commissariat a l'Energie Atomique, Paris, France

[21] Appl. No.: 774,126

[22] Filed: Mar. 3, 1977

[30] Foreign Application Priority Data

Mar. 12, 1976 France .................................. 76.07189

[51] Int. Cl.² ............................................. B01D 11/04
[52] U.S. Cl. .................................. 23/267 R; 23/267 B; 23/259; 23/292; 73/421 B
[58] Field of Search ........ 23/273 R, 272 SC, 267 MS, 23/269 R, 259, 267 R, 267 B, 292; 73/421 B

[56] References Cited

U.S. PATENT DOCUMENTS

| | | | |
|---|---|---|---|
| 2,693,705 | 11/1954 | Casler | 73/421 B |
| 2,859,020 | 11/1958 | Eddy | 23/259 |
| 2,951,689 | 9/1960 | Asp | 23/259 |
| 2,990,256 | 6/1961 | Lovins | 23/259 |
| 3,143,393 | 8/1964 | Hons | 23/259 |
| 3,223,486 | 12/1965 | Holl | 23/259 |
| 3,484,204 | 12/1969 | Caviness | 23/259 |
| 3,545,864 | 12/1970 | Dibbern | 23/259 |
| 3,645,142 | 2/1972 | Turpin | 23/259 |
| 3,649,218 | 3/1972 | Pontigny | 23/259 |
| 3,684,452 | 8/1972 | Bessman | 23/259 |
| 3,715,190 | 2/1973 | Park | 23/259 |

Primary Examiner—Stephen J. Emery

[57] ABSTRACT

The device comprises a vertically movable platform for supporting extraction flasks placed above compressed-air impellers. Withdrawal of the top liquid phase from each flask is performed by means of a vertical suction duct, the top end of which has its opening within a non-return chamber at a higher level than the opening of a tube which provides a communication with a pressure-reducing Venturi tube, ejector-nozzle and discharge pipe. The lower end of the suction tube is connected to a plurality of nozzles having their openings at the periphery of each extraction flask and extending in the same horizontal plane which can be set at a predetermined level.

7 Claims, 3 Drawing Figures

AUTOMATIC LIQUID-LIQUID EXTRACTION DEVICE

This invention relates to an automatic liquid-liquid extraction device and is concerned in particular with a device which permits agitation and settling of the two liquid phases followed at the end of the operation by quantitative removal of the entire liquid phase which is present in the extraction vessel, these operations being performed on a plurality of samples with a high degree of reproducibility.

A device of this type finds a large number of applications, especially for carrying out methods of analysis consisting of a stage in which certain constituents of the sample to be analyzed are extracted into a suitable solvent.

In this extraction stage, previously measured quantities of sample, of solvent and if necessary of reagents are introduced into an extraction vessel. The actual extraction of predetermined constituents of the sample into the solvent is then carried out by agitation of the phases which are present; after the mixture has been allowed to settle, one of the two phases which are present in the extraction vessel is then removed in order to retain at the end of the operation only the phase which is intended to undergo subsequent measurement or treatments. In some cases, especially when the heavy phase constitutes the utilizable phase, it is an advantage to allow this phase to remain in the extraction vessel in order to subject this latter to a further treatment if necessary. Under these conditions, quantitative removal of the light phase must be carried out with high precision in order to avoid any interference with this new treatment.

To this end, the invention relates to an automatic liquid-liquid extraction device which offers a considerable advantage since it has the precise object of ensuring that the entire light phase which is present in the extraction vessel is removed at the end of the operation with a high degree of reliability.

The device under consideration comprises at least one extraction vessel equipped with agitation means, liquid-withdrawal means associated with said vessel and means for supporting said vessel or vessels and said liquid-withdrawal means. In accordance with distinctive feature, said liquid-withdrawal means consist of a substantially vertical suction duct whose upper end is connected to a discharge pipe fitted with pneumatic pressure-reducing means and whose lower end is connected to a plurality of nozzles which open into the liquid of said vessel in the same horizontal plane at the periphery of said vessel, said withdrawal means being further provided with a leak-tight chamber connected at one end to said suction duct and at the other end to said discharge pipe, the level at which said duct opens into said chamber being higher than the level at which said pipe opens into said chamber.

Preferably, said duct and said pipe penetrate into the interior of said chamber.

In accordance with a first embodiment of the invention, the nozzles aforesaid are horizontal.

In accordance with a second embodiment of the invention, the nozzles aforesaid are oblique.

In a preferred form of the invention, said pneumatic pressure-reducing means are constituted by a Venturi tube, the ejector-nozzle of which has its opening at the level of the discharge pipe at the outlet of said Venturi tube.

As an advantageous feature, the device comprises means for adjusting to a given level the plane in which the nozzles of said withdrawal means have their openings. Thus, when the vessel contains two well-settled liquid phases, said duct is positioned so as to ensure that said nozzles open into the liquid at the level of the interface between the two phases. By reason of the special shape of said suction duct, the entire quantity of light phase can be removed by carrying out the suction of the liquid in the vicinity of the vessel walls, thus making it possible to break-up and remove the meniscus which forms the interface.

In accordance with a further embodiment of the invention which is particularly advantageous for the performance of a number of simultaneous extractions, the means for supporting said vessel or vessels and the means for supporting said liquid-withdrawal means are constituted respectively by:

a movable platform which also supports said agitation means, said platform being capable of vertical motion between a bottom position and a top position, and by a fixed structure for additionally supporting closure means for said vessel or vessels; said platform and said structure are arranged respectively and positioned with respect to each other in such a manner as to ensure that, in the top position of said platform, each vessel is fitted with closure means and associated with liquid-withdrawal means and that, in the bottom position of said platform, each vessel is disengaged from said closure means and from said liquid-withdrawal means so as to permit loading or unloading of said vessel.

In accordance with a characteristic feature of the device of the invention, the closure means advantageously consist of a plug freely mounted in translational motion on the suction duct of the liquid-withdrawal means associated with said vessel.

In accordance with another characteristic feature of th device, the agitation means associated with each vessel are constituted by a compressed-air impeller having a magnetized rotor, said impeller being capable of imparting motion to a magnetic bar which is placed within said vessel.

In accordance with an alternative embodiment of the device of the invention, the agitation means associated with said vessels are constituted by magnetized drive units, each unit being capable of imparting motion to a magnetic bar placed within one of said vessels, said units being driven in rotation simultaneously from a single motor by transmission means.

As an advantageous feature, the agitation means and the liquid-withdrawal means are remotely controlled by pneumatic means. In this manner, automatic operation of the device is carried out entirely in pneumatic logic, thus making the device intrinsically explosion-proof since it does not require any electric current in order to operate.

A more complete understanding of the invention will be gained from the following description which is not given in any limiting sense, reference being made to the accompanying drawings, in which.

Figure 1:
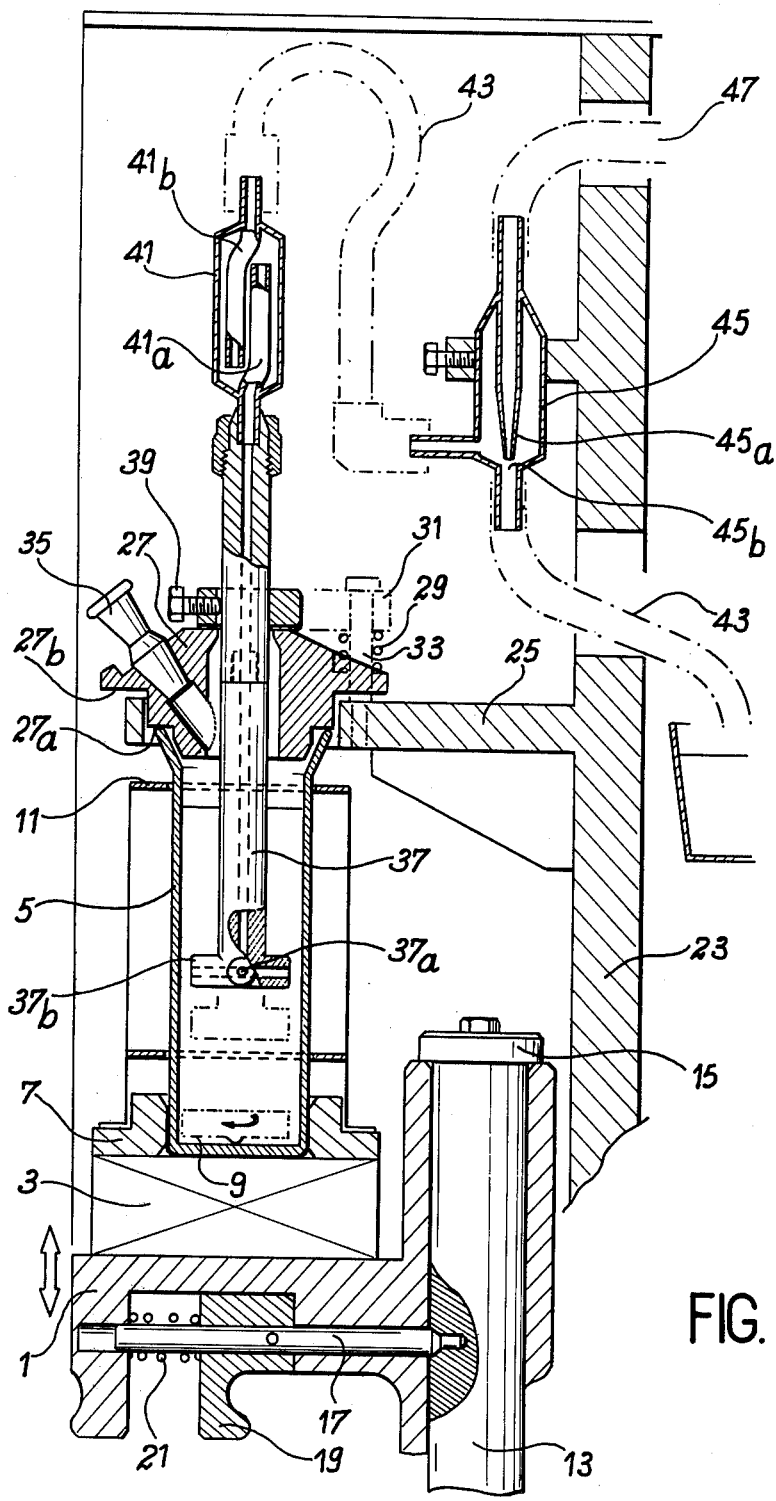
FIG. 1 is a diagrammatic vertical sectional view of the device according to the invention.

Referring to FIG. 1, th device according to the invention is shown in the operating position. This device comprises a movable platform 1 for supporting compressed-air impellers 3 and extraction vessels constituted by flasks 5 each have a frusto-conical opening. Only one extraction flask 5 can be seen in the sectional view of this figure but the platform supports a plurality of flasks and the means described hereinafter in connection with the flask 5 are associted with each flask.

The extraction flask 5 is positioned above the compressed-air impeller 3 within a recess limited by centering rings 7. A magnetic bar 9 coated with Teflon serves to carry out the agitation within the flask 5 under the influence of the movement of the magnetized rotor of the impeller 3. The flask 5 is maintained in the vertical position by means of a basket 11 which is also employed for loading and unloading the extraction flasks.

The platform 1 is capable of vertical displacement in sliding motion on a guide column 13, the upper end of which is provided with a stop 15. In this FIGURE, the platform is shown in the top position and is locked automatically in this position by means of the locking-bolt 17 which comes into position within a locking recess formed in the top portion of the column 13. Said locking-bolt is rigidly fixed to a trigger 19 which maintains it in the locked position under the pressure of a spring 21.

When the trigger 19 is actuated, the locking-bolt 17 is released from its recess and the platform is permitted to move downwards to a bottom position in which it rests on the frame (not shown) of the device.

The apparatus also comprises a fixed structure 23 and a closure plug 27 which is freely displaceable in vertical translational motion and mounted on said structure by means of a table 25. Said plug 27 is advantageously made of Teflon and provided on the one hand with a bearing surface 27a so that it can be applied against the frusto-conical opening of the flask 5 in order to ensure that this latter is sealed and, on the other hand, with an annular shoulder 27b which enables the plug to rest on the table 25. Said plug 27 is maintained applied either against the flask 5 or against the table 25 by means of a spring 29 mounted between the plug 27 and a positioning flange-plate 31 fixed on the table 25 by means of guides 33 on which the plug is slidably mounted. The side of the plug is pierced so as to form an orifice which is intended to receive a ground glass stopper 35, said orifice being provided for the purpose of introducing the various reagents into the flask 5 when the plug 27 is in the position of closure. The plug 27 is also pierced by an axial bore traversed by a suction duct 37 formed of Teflon, for example, and intended to ensure withdrawal of the top liquid phase contained in the flask 5.

At the lower end 37a, the suction duct 37 is put into communication with a plurality of nozzles 37b which have their openings in the same horizontal plane at the periphery of the flask 5. In this example of construction, the nozzles 37b are four in number and placed at right angles to each other. A lock-screw 39 serves to set at a given level the plane in which the nozzles 37b are intended to open. At the upper end, the suction duct 37 is connected in leak-tight manner by means of a non-return chamber 41 to a discharge pipe 43 fitted with pressure-reducing means consisting of a Venturi tube 45 which is supplied with compressed air from a pipe 47.

The ejector-nozzle 45a opens into the Venturi tube 45 at the level of the discharge pipe 43, at the outlet 45b of the Venturi tube 45.

The non-return chamber 41 is constituted by a leak-tight enclosure into which penetrate a first tube 41a connected to the suction duct 37 and a second tube 41b which is connected to the discharge pipe 43. The tubes 41a and 41b have their openings within the interior of the chamber at different levels and the tube 41a has its opening at a higher level than the tube 41b.

In this manner, the liquid contained in the pipe 43 is prevented from returning to the suction duct 37 at the end of the suction process by reason of the difference in levels at which the tubes 41a and 41b have their openings.

Figure 2:
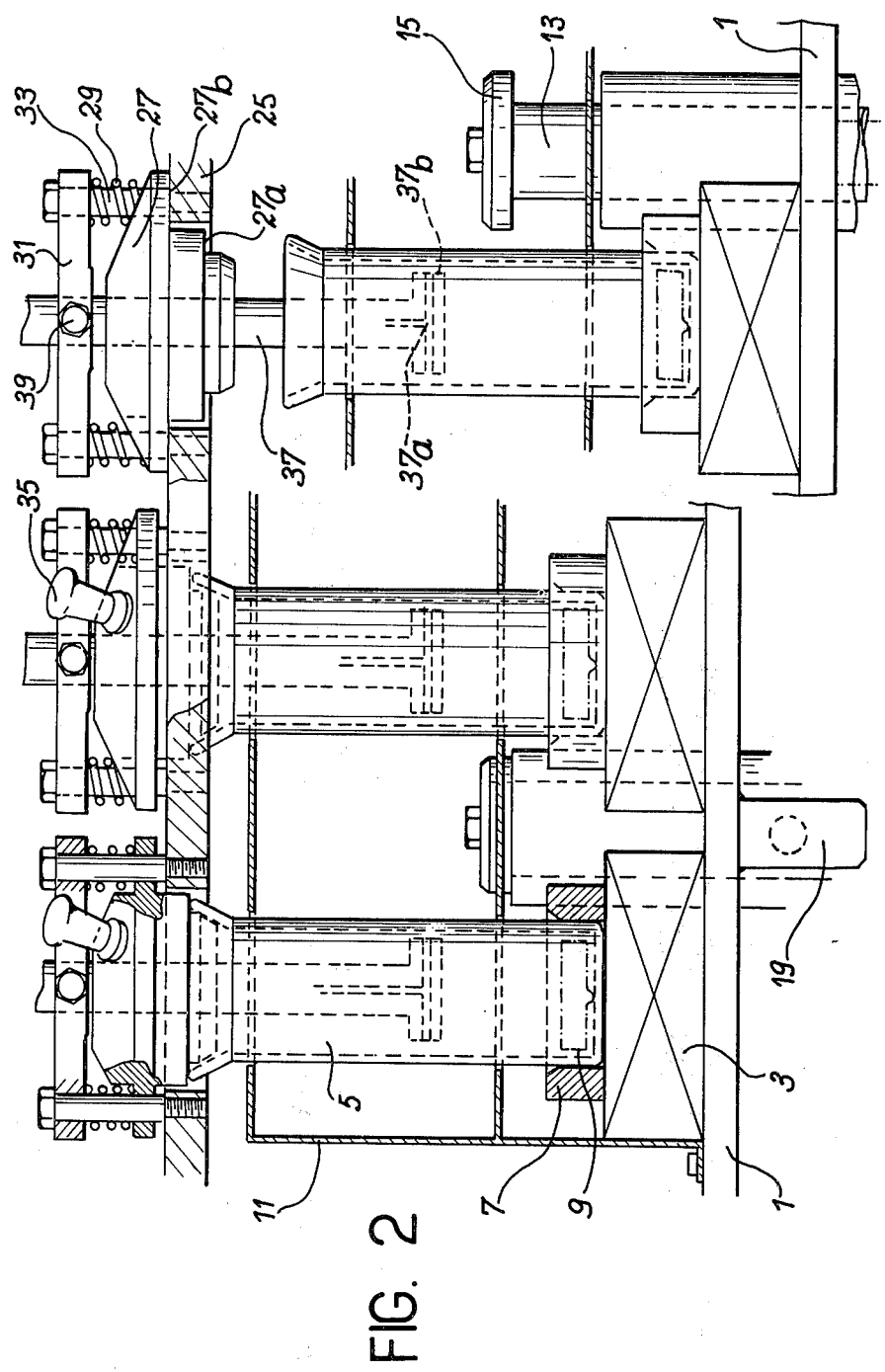
FIG. 2 is a diagrammatic vertical part-sectional view of the device according to the invention, this view being taken along a plane at right angles to that of FIG. 1.

Referring to FIG. 2 which is a vertical part-sectional view of the device in accordance with the invention, this view being taken along a plane at right angles to that of FIG. 1, there is shown the series arrangement of the extraction flasks 5 which are maintained on the movable platform 1 by means of the baskets 11. In the right-hand portion of this figure, the movable platform 1 is shown in an intermediate position. It is thus possible to see in greater detail the method adopted for supporting the plugs 27 on the table 25 and in particular the arrangement adopted between the positioning flange-plate 31, the guides 33, the table 25 and the springs 29. At the time of displacement in translational motion, the closure plugs 27 are guided by means of the guides 33 and the pressure of the springs 29 mounted between the positioning flange-plates 31 and the closure plugs 27 maintains these latter firmly applied against the flasks 5 when these latter are in the closed position.

There are also shown in this FIGURE the two other nozzles 37b of the suction duct 37, said nozzles being placed at right angles to the nozzles shown in FIG. 1.

Although these FIGURES show horizontally placed nozzles 37b, said nozzles can be arranged in a slightly different manner. For example, they can be placed obliquely and open into the extraction flask 5 at a level which is different from that of their point of junction 37a with the suction duct 37. In the case which has just been considered, the nozzles 37b also have their opening in the same horizontal plane.

In the right-hand portion of this FIGURE, the movable platform 1 is shown in one of the positions which it occupies during displacement between its top position and its bottom position as it slides along the guide column 13. In this intermediate position, the closure plug 27 which is no longer in contact with the extraction flask 5 is applied against the table 25 by means of its annular shoulder 27b. Thus the flask is completely freed from its closure means but is still not released from the withdrawal means which is associated therewith since the suction duct 37 still remains inserted in the flask 5.

In the bottom position of the platform 1, the lower end of said duct 37 is no longer engaged within the extraction flask 5.

The operation of the device is as follows. When the movable platform 1 is in the bottom position, the baskets 11 containing the extraction flasks 5 which have previously been filled with samples are loaded onto the movable platform 1 in such a manner as to place said flasks within the recesses provided for this purpose and limited by the centering rings 7. The movable platform 1 is actuated so as to bring this latter to the top position. When said platform comes into contact with the stop 15, the locking-bolt moves automatically into position within the locking recess provided for this purpose in the guide column 13 and the platform is locked in this position. At the time of upward motion of the platform, the flasks 5 have dislodged the closure plugs 27 from their seating and these latter are accordingly positioned on the flasks 5 under the action of the springs 29, with the result that the system is thus made leak-tight and the suction ducts 37 have been introduced into the interior of the extraction flasks 5.

After removing the ground glass stopper 35, the solvent as well as any reagents which may be required for the extraction process are introduced into each flask. The stopper 35 is replaced in position and the compressed-air impellers 3 are started-up in order to ensure that the liquid phases which are present within each flask 5 are agitated by means of the magnetic bars 9. After a predetermined agitation time, the impellers are stopped and the mixture is thus subjected to settling for a predetermined perod of time. At the end of the settling period, the top light phase contained in each extraction flask is then withdrawn.

To this end, the position of the suction duct 37 has previously been adjusted by producing action on the lock-screw 39 so as to ensure that the nozzles 37b open exactly at the level of the interface between the two phases. By supplying the Venturi tubes 45 with compressed air through the pipe 47, suction of the light phase and discharge of this latter through the pipe 43 are thus ensured. The special shape of the suction duct 37 and the combined action of the Venturi tube 45 make it possible to break-up and entirely remove the light-phase meniscus which forms the interphase and thus to ensure removal of the entire quantity of light phase. Moreover, the particular design of the Venturi tube 45 makes it possible to prevent any obstruction of the outlet 45b by deposits derived from the light phase since there is no stagnation of liquid within the Venturi tube 45.

When the nozzles 37b are no longer in contact with the liquid, the entire quantity of light phase has been discharged into the pipe 43. The Venturi tubes 45 are then stopped and the liquid which is present within the pipes 43 is prevented at this moment from returning to the flasks 5 via the ducts 37 by means of the non-return chambers 41. In fact, this liquid is poured into the chamber 41 via the tube 41b but cannot pass into the duct 37 by reason of the high level of the tube 41a.

On completion of this operation, the movable platform 1 is moved downwards by actuating the trigger 19 in order to unlock this latter. At the time of downward motion of the platform, the extraction flasks 5 are released from their closure means 27 and are completely freed from the suction ducts 37 in the bottom position of the platform. The flasks can then be unloaded.

In some cases, the platform 1 is left in the top position and the heavy phase which is isolated within the flasks 5 undergoes either a further extraction operation or a washing operation. After removing the ground glass stopper 35, the reagents which are necessary for this operation are introduced and there are again carried out the stages of agitation, settling and removal of the top light phase in order to have a fresh solvent phase on completion of the operation.

In the mode of operation described in the foregoing, start-up of the compressed-air impellers 3 and of the Venturi tubes 45 is initiated automatically by pneumtic means which determine the times of agitation, settling and withdrawal of the light phase in accordance with a preselected sequence.

Figure 3:
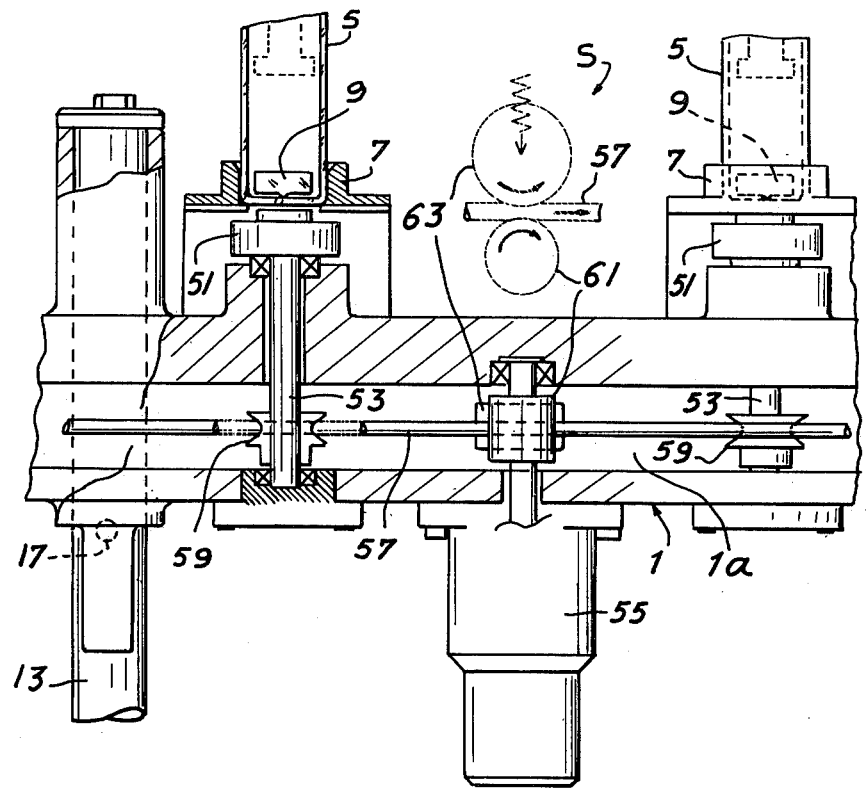
FIG. 3 is a diagrammatic vertical part-sectional view of an alternative embodiment of the device according to the invention.

Referring now to FIG. 3, there is shown an alternative form of the device in accordance with the invention which differs from the device shown in FIGS. 1 and 2 in the nature of the agitation means which are associated with the extraction flasks.

This FIGURE is a diagrammatic representation of the device in a partial vertical cross-section which is similar to that FIG. 2 and the same references have again been employed in this figure to designate identical components of said device.

In this alternative embodiment, each extraction flask 5 fitted with a magnetic bar 9 as in the previous instance is positioned above a magnetized drive unit 51, the shaft 53 of which is driven in rotation by a pneumatic or electric motor 55 by means of the drive belt 57 located within a space 1a of the platform 1 and mounted on each pulley 59 which is keyed on a shaft 53. Said drive belt 57 is driven by a system comprising the driving roller 61 of the motor 55 and a pressure roller 63 associated with the roller 61 as shown in the folded-back cross-section (S) of this drive system which is illustrated in FIG. 3.

By starting-up the motor 55, all the magnetized drive units 51 are driven in rotation at the same speed, thus permitting uniform agitation within all the extraction flasks 5 as a result of setting in motion of the magnetic bars 9. This accordingly ensures an identical extraction efficiency within each flask.

Moreover, driving of the agitation means by a single motor has a further advantage in that it prevents racing of a certain number of drive units 51 when an extraction flask 5 is not present above these latter.

By way of example, the device in accordance with the invention has proved to be particularly advantageous in the extraction of urinary steroids which involve the successive operations described hereunder.

There is placed on the apparatus a bank of glass extraction flasks each having a conical mouth and containing between 5 and 10 ml of urinary hydrolysate previously obtained in said flasks by action of hydrochloric acid in the hot state on samples of urine. The platform being in the top position, an extraction of steroids is performed after having introduced 10 to 25 ml of trichlorethylene or chloroform. The mixture is then agitated and allowed to settle in order to carry out extraction of the steroids into the solvent phase consisting of trichlorethylene or chloroform. After settling, the light aqueous phase is removed. At this moment, 5 ml of sodium hydroxide are introduced into the extraction flasks, a further agitation is performed, this being followed by settling and removal of the light phase. A quantity of 5 ml of water is again introduced into each flask, the mixture is again subjected to agitation and further settling, whereupon all traces of top aqueous phase are removed by the drawing-off systems.

The following analysis has served to establish the fact that the device in accordance with the invention also provides excellent reproducibility. The analysis relates to the extraction of methylene blue in a buffered acetic acid medium (pH 4.5) by chloroform with addition of cobalt nitrate in order to obtain an extractable complex which is photometrically measurable at 650 nanometers.

Fourteen extraction flasks containing 10 ml of aqueous solution of methylene blue and cobalt nitrate were subjected to extraction with 20 ml of chloroform. After removal of the aqueous phases, photometric measurement was performed on the solvent phase consisting of chloroform and containing the extractable complex of methylene blue and he following optical densities were obtained in vessels having an optical path of 1 cm: 0.870 − 0.875 − 0.860 − 0.870 − 0.835 − 0.870 − 0.860 − 0.845 − 0.870 − 0.850 − 0.865 − 0.840 − 0.840 − 0.840, namely a mean value of 0.8564.

A standard relative deviation of 1.66% is thus obtained and excellent reproducibility is accordingly achieved by the apparatus.

What we claim is:

1. An automatic liquid-liquid extraction device comprising at least one extraction vessel equipped with agitation means, liquid-withdrawal means associated with said vessel and means for supporting said vessel or vessels and said liquid-withdrawal means, wherein said liquid-withdrawal means consist of a substantially vertical suction duct whose upper end is connected to a discharge pipe fitted with pneumatic pressure-reducing means and whose lower end is connected to a plurality of nozzles which open into the liquid of said vessel in the same horizontal plane at the periphery of said vessel, said withdrawal means being further provided with a leak-tight chamber connected at one end to said suction duct and at the other end to said discharge pipe, the level at which said duct opens into said chamber being higher than the level at which said pipe opens into said chamber said pneumatic pressure-reducing means being constituted by a Venturi tube so arranged that the ejector-nozzle of said tube has its opening at the level of the discharge pipe at the outlet of said Venturi tube, said means for supporting said vessel or vessels and the means for supporting said liquid-withdrawal means being constituted respectively by:

a movable platform which also supports said agitation means. said platform being capable of vertical motion between a bottom position and a top position, and by a fixed structure for additionally supporting closure means for said vessel or vessels; said platform and said structure being arranged respectively and positioned with respect to each other in such a manner as to ensure that, in the top position of said platform, each vessel is fitted with closure means and associated with liquid-withdrawal means and that, in the bottom position of said platform, each vessel is disengaged from said closure means and from said liquid-withdrawal means so as to permit loading and unloading of said vessel, said closure means consisting of a plug freely mounted in translational motion on the suction duct of the liquid-withdrawal means associated with said vessel or vessels.

2. A device according to claim 1, wherein said duct and said pipe penetrate into the interior of said chamber.

3. A device according to claim 1, wherein the nozzles aforesaid are horizontal.

4. A device according to claim 1, wherein the nozzles aforesaid are oblique.

5. A device according to claim 1, wherein said device comprises means for adjusting to a given level the plane in which the nozzles of said withdrawal means have their openings.

6. A device according to claim 1, wherein the agitation means associated with each vessel are constituted by a compressed-air impeller having a magnetized rotor, said impeller being capable of imparting motion to a magnetic bar which is placed within said vessel.

7. A device according to claim 1, wherein the agitation means associated with said vessels are constituted by magnetized drive units, each unit being capable of imparting motion to a magnetic bar placed within one of said vessels, said units being driven in rotation simultaneously from a single motor by transmission means.

* * * * *